US00RE45458E

(19) United States
(12) Reissued Patent
Roussel et al.

(10) Patent Number: US RE45,458 E
(45) Date of Reissued Patent: Apr. 7, 2015

(54) DUAL FUNCTION SYSTEM AND METHOD FOR SHUFFLING PACKED DATA ELEMENTS

(75) Inventors: Patrice Roussel, Portland, OR (US); Srinivas Chennupaty, Portland, OR (US); Micheal D. Cranford, Hillsboro, OR (US); Mohammed A. Abdallah, San Jose, CA (US); James Coke, Shingle Springs, CA (US); Katherine Kong, Folsom, CA (US)

(73) Assignee: Intel Corporation, Santa Clara, CA (US)

(21) Appl. No.: 10/104,205

(22) Filed: Mar. 21, 2002

Related U.S. Patent Documents

Reissue of:
(64) Patent No.: 6,041,404
Issued: Mar. 21, 2000
Appl. No.: 09/052,996
Filed: Mar. 31, 1998

(51) Int. Cl.
*G06F 9/315* (2006.01)
*G06F 15/78* (2006.01)

(52) U.S. Cl.
CPC ..... *G06F 15/7885* (2013.01)

(58) Field of Classification Search
USPC ..... 712/210
See application file for complete search history.

(56) References Cited

U.S. PATENT DOCUMENTS

| | | | |
|---|---|---|---|
| 3,711,692 A | 1/1973 | Batcher | |
| 3,723,715 A | 3/1973 | Chen et al. | |
| 4,139,899 A | 2/1979 | Tulpule et al. | |
| 4,161,784 A | 7/1979 | Cushing et al. | |
| 4,393,468 A | 7/1983 | New | |
| 4,418,383 A | 11/1983 | Doyle et al. | |
| 4,498,177 A | 2/1985 | Larson | |
| 4,707,800 A | 11/1987 | Montrone et al. | |
| 4,771,379 A | 9/1988 | Ando et al. | |
| 4,903,228 A | 2/1990 | Gregoire et al. | |
| 4,989,168 A | 1/1991 | Kuroda et al. | |
| 5,019,968 A | 5/1991 | Wang et al. | 712/4 |
| 5,081,698 A | 1/1992 | Kohn | |
| 5,095,457 A | 3/1992 | Jeong | |
| 5,168,571 A | 12/1992 | Hoover et al. | |

(Continued)

FOREIGN PATENT DOCUMENTS

| | | |
|---|---|---|
| WO | WO 97/07450 A1 | 2/1997 |
| WO | WO 97/09671 A1 | 3/1997 |
| WO | WO 97/32278 A1 | 9/1997 |

OTHER PUBLICATIONS

"Visual Instruction Set (VIS™) User's Guide", Version 1.1, Mar. 1997, pp. i-vii & 1-136.*

(Continued)

*Primary Examiner* — Eric Coleman
(74) *Attorney, Agent, or Firm* — Blakely, Sokoloff, Taylor & Zafman LLP

(57) ABSTRACT

An apparatus and method for performing a shuffle operation on packed data using computer-implemented steps is described. In one embodiment, a first packed data operand having at least two data elements is accessed. A second packed data operand having at least two data elements is accessed. One of the data elements in the first packed data operand is shuffled into a lower destination field of a destination register, and one of the data elements in the second packed data operand is shuffled into an upper destination field of the destination register.

38 Claims, 6 Drawing Sheets

(56) References Cited

U.S. PATENT DOCUMENTS

| | | | | | |
|---|---|---|---|---|---|
| 5,187,679 | A | | 2/1993 | Vassiliadis et al. | |
| 5,268,995 | A | | 12/1993 | Diefendorff et al. | |
| 5,321,810 | A | | 6/1994 | Case et al. | 345/562 |
| 5,327,543 | A | * | 7/1994 | Miura et al. | 712/224 |
| 5,390,135 | A | | 2/1995 | Lee et al. | |
| 5,408,670 | A | | 4/1995 | Davies | |
| 5,423,010 | A | | 6/1995 | Mizukami | |
| 5,426,783 | A | | 6/1995 | Norrie et al. | |
| 5,465,374 | A | | 11/1995 | Dinkjian et al. | |
| 5,487,159 | A | * | 1/1996 | Byers et al. | 712/223 |
| 5,497,497 | A | | 3/1996 | Miller et al. | 713/1 |
| 5,579,253 | A | | 11/1996 | Lee et al. | |
| 5,594,437 | A | | 1/1997 | O'Malley | |
| 5,625,374 | A | | 4/1997 | Turkowski | |
| 5,680,161 | A | | 10/1997 | Lehman et al. | |
| 5,781,457 | A | | 7/1998 | Cohen et al. | |
| 5,802,336 | A | | 9/1998 | Peleg et al. | |
| 5,819,117 | A | * | 10/1998 | Hansen | 712/300 |
| 5,881,259 | A | * | 3/1999 | Glass et al. | 712/210 |
| 5,909,572 | A | | 6/1999 | Thayer et al. | |
| 5,931,945 | A | * | 8/1999 | Yung et al. | 712/300 |
| 5,933,650 | A | * | 8/1999 | van Hook et al. | 712/2 |
| 6,002,881 | A | * | 12/1999 | York et al. | 712/34 |
| 6,041,404 | A | | 3/2000 | Roussel et al. | |
| 6,058,465 | A | * | 5/2000 | Nguyen | 712/7 |
| 6,115,812 | A | | 9/2000 | Abdallah et al. | |
| 6,223,277 | B1 | * | 4/2001 | Karguth | 712/224 |
| 6,243,808 | B1 | | 6/2001 | Wang | |
| 6,381,690 | B1 | * | 4/2002 | Lee | 712/223 |

OTHER PUBLICATIONS

Mano, Morris M. , Computer System Architecture 1982, Prentice Hall, 2d Ed. pp. 140-144.*
Motorola, MC68020 32-bit Microprocessor User's Manual 1985, Prentice Hall, 2d Ed. pp. B-101 -B-103, B-135, B-136, B-169,B-170.*
Peleg, A, etal, Intel MMX for Multimedia PCs, Jan. 1997, Communications of the ACM, vol. 40, No. 1, pp. 25-38.*
Hansen,C, MicroUnity's MediaProcessor Architecture, 1996, IEEE, pp. 34-41.*
"Visual Instruction Set (VIS) User's Guide", Version 1.1, Mar. 1997, pp. i-xii & 1-136.*
European Search Report, EP 99 30 2378, Mar. 14, 2000, 3 pages.
Austrian Search Report, Appln. No. 9901342-7, Oct. 31, 2000, 7 pages.
Intel Corporation, "Intel Architecture Software Developer's Manual, vol. 2; Instruction Set Reference," 1999, 26 pages.
Intel Corporation, "Willamette Processor Developer's Guide," Manual, Feb. 2000, 16 pages.
Tri-Media, "TM1000 Preliminary Data Book," Phillips Electronics No. Amer., 1997, 30 pages.
Silicon Graphics, "Silicon Graphics Introduces Compact MIPS® RISC Microprocessor Code for High Performance at a Low Cost," Oct. 21, 1996, 13 pages.
"MIPS Digital Media Extension," *Set Architecture Specification*, http:/_/www.mips.com/MDMXspec.ps (Oct. 21, 1997), 8 pages.
Hewlet Packard, "64-bit and Multimedia Extensions in the PA-RISC 2.0 Architecture," Microprocessors Precision Architecture, 1997, 18 pages.
Sun Microsystems, Ultrasparc™ The Visual Instruction Set (VIS™): On Chip Support for New-Media Processing, Whitepaper 95-022, 1996, 7 pages.
Kawakami, Y., et al., "A Single-Chip Digital Signal Processor for Voiceband Applications," IEEE, 1980 International Solid-State Circuits Conference, pp. 40-41.
U1traSPARC Multimedia Capabilities On-Chip Support for Real0-Time Video and Advanced Graphics; SPARC Technology Business, Sep. 1994, Sun Microsystems, Inc.
Case, B., "Philips Hopes to Displace DSPs with VLIW, TriMedia Processors Aimed at Future Multimedia Embedded Apps," Microprocessor Report, Dec. 1994, pp. 12-18.
Gwennap, L., "New PA-RISC Processor Decodes MPEG Video, H"'s PA-7100LC Uses New Instructions to Eliminate Decoder Chip, Microprocessor Report, Jan. 1994, pp. 16-17.
TMS320c2X, User's Guide, Digital Signal Processing Products, Texas Instruments, 1993, pp. 3-2-3-11; 3-28-3-34; 4-1-4-22; 4-41; 4-103; 4-119; 4-120; 4-122; 4-150; 4-151.
i860 TM. Microprocessor Family Programmer's Reference Manual, Intel Corporation, 1992, Chapters 1, 3, 8, and 12.
Lee, R.B., "Accelerating Multimedia with Enhanced Microprocessors," IEEE Micro, Apr. 1995, pp. 22-32.
Pentium Processor's User's Manual, vol. 3: Architecture and Programming Manual, Intel Corporation, 1993, Chapters 1, 3, 4, 6, 8, and 18.
Margulis, N., "i860 Microprocessor Architecture," McGraw Hill, Inc., 1990, Chapters 6, 7, 8, 10, and 11.
Intel i750, i860 TM, i960 Processors and Related Products, 1993, pp. 1-3.
Motorola MC88110 Second Generation RISC Microprocessor User's Manual, Motorola, Inc., 1991.
MC88110 Second Generation-RISC Microprocessor User's Manual, Motorola, Inc., Sep. 1992, pp. 2-1 through 2-22, 3-1 through 3-32, 5-1 through 5-25, 10-62 through 10-71, Index 1 through 17.
Errata to MC88110 Second Generation RISC Microprocessor User's Manual, Motorola, Inc., 1992, pp. 1-11.
MC88110 Programmer's Reference Guide, Motorola, Inc., 1992, pp. 1-4.
Shipnes, J., "Graphics Processing with the 88110 RISC Microprocessor," Motorola, Inc., IEEE, No. 0-8186-26455-0/92, 1992, pp. 169-174.
Abbott, et al., "Broadband Algorithms with the MicroUnity Mediaprocessor," MicroUnity Systems Engineering, Inc., Proceedings of Compcon, IEEE, 1996, pp. 349-354.
Advanced Micro Devices, Inc., "AMD-3D Technology Manual," Feb. 1998, pp. 1-58.
Diefendorff, K., et al., "AltiVec Extension to PowerPC Accelerates Media Processing," IEEE, #0272-1732/00, 2000, pp. 85-95.
Hansen, C., "Architecture of a Broadband Mediaprocessor," Proceedings of Compcon, IEEE, 1996, pp. 334-340.
Hayes, et al., "MicroUnity Software Development Environment," MicroUnity Systems Engineering, Inc., Proceedings of Compcon, IEEE, 1996, pp. 341-348.
Intel Corporation, "Intel Architecture Software Developer's Manual, vol. 2; Instruction Set Reference," 1999, 26 pgs.
Intel Corporation, "IA-32 Intel® Architecture Software Developer's Manual, vol. I: Basic Architecture," 2002, 21 pgs. total.
Intel Corporation, "IA-32 Intel® Architecture Software Developer's Manual, vol. II: Instruction Set Reference," 2002, 19 pgs. total.
Intel Corporation, "Intel® Itanium™ Architecture Software Developer's Manual, vol. 3: Instruction Set Reference," Rev. 2.0, Dec. 2001, 30 pgs. total.
Intel Corporation, "Inte1486™ Microprocessor Family Programmer's Reference Manual," 1992, 44 pgs. total.
Intel Corporation, "Pentium® Processor Family Developer's Manual, vol. 3: Architecture and Programming Manual," 1995, 54 pgs. total.
Intel Corporation, "Pentium® Processor User's Manual, vol. 3: Architecture and Programming Manual," 1993, 50 pgs. total.
Levinthal, et al., "Chap—A SIMD Graphics Processor," Computer Graphics Project, ACM, vol. 18, No. 3, Jul. 1984, pp. 77-81.
Levinthal, et al., "Parallel Computers for Graphics Applications," Proceedings: Second Int'l. Conf. on Architectural Support for Programming Languages and Operating Systems, (ASPLOS II), IEEE, 1987, pp. 193-198.
Wang, et al., "A Processor Architecture for 3D Graphics Calculations," Computer Motion, Inc., Goleta, CA, 23 pgs.
U.S. Appl. No. 13/732,243, filed Dec. 31, 2012.
U.S. Appl. No. 14/283,020, filed May 20, 2014.
Craig Hansen, "Architecture of a Broadband Mediaprocessor" 1996 IEEE Proceedings of COMPCON '96, pp. 334-340.

* cited by examiner

START
S500
S510
STORE X0, X1, X2, X3 AS DATA ELEMENTS IN A PACKED DATA ITEM 515 (REGISTER Xmm0)
515
X3
X2
X1
X0
S520
STORE Y0, Y1, Y2, Y3 AS DATA ELEMENTS IN A PACKED DATA ITEM 525 (REGISTER Xmm1)
525
Y3
Y2
Y1
Y0
S530
SHUFFLE ANY ONE OF {X3,X2,X1,X0} INTO LOWER TWO FIELDS AND ANY ONE OF {Y3,Y2,Y1,Y0} INTO UPPER TWO FIELDS
535
ANY ONE OF {Y3,Y2,Y1,Y0}
ANY ONE OF {Y3,Y2,Y1,Y0}
ANY ONE OF {X3,X2,X1,X0}
ANY ONE OF {X3,X2,X1,X0}
END

DUAL FUNCTION SYSTEM AND METHOD FOR SHUFFLING PACKED DATA ELEMENTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 6,041,404, which is hereby incorporated by reference in its entirety. The reissue applications are application Ser. No. 10/104,205 (the present and parent reissue application) and Ser. No. 14/283,020 which is a reissue continuation of application Ser. No. 10/104,205.*

FIELD OF THE INVENTION

The present invention relates in general to the field of computer systems, and in particular, to an apparatus and method for performing multidimensional computations based on a shuffle operation.

BACKGROUND OF THE INVENTION

To improve the efficiency of multimedia applications, as well as other applications with similar characteristics, a Single Instruction, Multiple Data (SIMD) architecture has been implemented in computer systems to enable one instruction to operate on several data simultaneously, rather than on a single data. In particular, SIMD architectures take advantage of packing many data elements within one register or memory location. With parallel hardware execution, multiple operations can be performed with one instruction, resulting in significant performance improvement.

Although many applications currently in use can take advantage of such operations, known as vertical operations, there are a number of important applications which would require the rearrangement of the data elements before vertical operations can be implemented so as to provide realization of the application. Examples of such important applications include the dot product and matrix multiplication operations, which are commonly used in 3-D graphics and signal processing applications.

One problem with rearranging the order of data elements within a register or memory word is the mechanism used to indicate how the data should be rearranged. Typically, a mask or control word is used. The control word must include enough bits to indicate which of the source data fields must be moved into each destination data field. For example, if a source operand has eight data fields, requiring three bits to designate any given data field, and the destination register has four data fields, (3×4) or 12 bits are required for the control word. However, on a processor implementation where there are less than 12 bits available for the control register, a full shuffle cannot be supported.

Therefore, there is a need for a way to reorganize the order of data elements where less than the full number of bits is available for a control register.

SUMMARY OF THE INVENTION

The present invention provides an apparatus and method for performing a shuffle operation on packed data using computer-implemented steps is described. In one embodiment, a first packed data operand having at least two data elements is accessed. A second packed data operand having at least two data elements is accessed. One of the data elements in the first packed data operand is shuffled into a lower destination field of a destination register, and one of the data elements in the second packed data operand is shuffled into an upper destination field of the destination register.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF A PREFERRED EMBODIMENT OF THE PRESENT INVENTION

In the following description, numerous specific details are set forth to provide a thorough understanding of the invention. However, it will be understood by one of ordinary skill in the art that the invention may be practiced without these specific details. In other instances, well-known circuits, structures and techniques have not been shown in detail in order not to obscure the invention.

The present invention provides a way to reorganize the order of data elements where less than the full number of bits is available for a control register. According to one aspect of the invention, a method and apparatus are described for moving data elements in a packed data operand (a shuffle operation). The shuffle operation allows shuffling of certain-sized data into any combination from two source registers or memory into a destination register. The destination register may be the same as a source register. The shuffle instruction is useful in data reorganization and in moving data into different locations of the register to allow, for example, extra storage for scalar operations, or for facilitating the conversion between data formats such as from packed integer to packed floating point and vice versa.

The term "registers" is used herein to refer to the on-board processor storage locations that are used as part of macroinstructions to identify operands. In other words, the registers referred to herein are those that are visible from the outside of the processor (from a programmers perspective). However, the registers described herein can be implemented by circuitry within a processor using any number of different techniques, such as dedicated physical registers, dynamically allocated physical registers using register renaming, combinations of dedicated and dynamically allocated physical registers, etc.

COMPUTER SYSTEM

Figure 1:
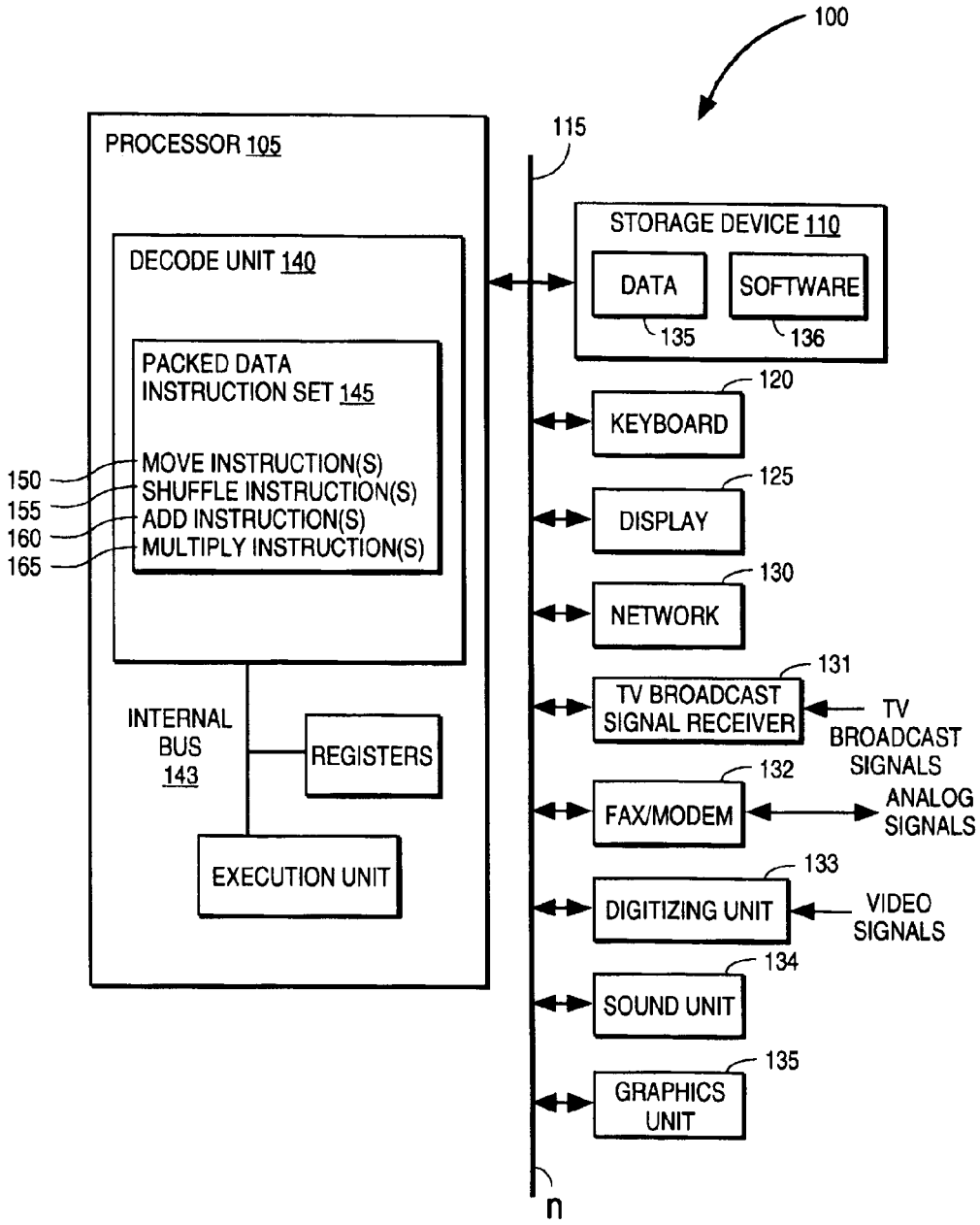
FIG. 1 illustrates an exemplary computer system in accordance with one embodiment of the invention.

FIG. 1 illustrates one embodiment of a computer system 100 which implements the principles of the present invention. Computer system 100 comprises a processor 105, a storage device 110, and a bus 115. The processor 105 is coupled to the storage device 110 by the bus 115. In addition, a number of user input/output devices, such as a keyboard 120 and a display 125, are also coupled to the bus 115. The processor 105 represents a central processing unit of any type of architecture, such as CISC, RISC, VLIW, or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., AGP, PCI, ISA, X-Bus, VESA, etc.) and bridges (also termed as bus controllers). While this embodiment is described in relation to a single processor computer system, the invention could be implemented in a multi-processor computer system. In addition, while this embodiment is described in relation to a 64-bit computer system, the invention is not limited to a 64-bit computer system.

In addition to other devices, one or more of a network 130, a TV broadcast signal receiver 131, a fax/modem 132, a digitizing unit 133, a sound unit 134, and a graphics unit 135 may optionally be coupled to bus 115. The network 130 and fax modem 132 represent one or more network connections for transmitting data over a machine readable media (e.g., carrier waves). The digitizing unit 133 represents one or more devices for digitizing images (i.e., a scanner, camera, etc.). The sound unit 134 represents one or more devices for inputting and/or outputting sound (e.g., microphones, speakers, magnetic storage devices, optical storage devices, etc.). The graphics unit 135 represents one or more devices for generating 3-D images (e.g., graphics card).

FIG. 1 also illustrates that the storage device 110 has stored therein data 135 and software 136. Data 135 represents data stored in one or more of the formats described herein. Software 136 represents the necessary code for performing any and/or all of the techniques described with reference to FIGS. 3-6. It will be recognized by one of ordinary skill in the art that the storage device 110 preferably contains additional software (not shown), which is not necessary to understanding the invention.

FIG. 1 additionally illustrates that the processor 105 includes decode unit 140, a set of registers 141, and execution unit 142, and an internal bus 143 for executing instructions. It will be recognized by one of ordinary skill in the art that the processor 105 contains additional circuitry, which is not necessary to understanding the invention. The decode unit 140, registers 141 and execution unit 142 are coupled together by internal bus 143. The decode unit 140 is used for decoding instructions received by processor 105 into control signals and/or microcode entry points. In response to these control signals and/or microcode entry points, the execution unit 142 performs the appropriate operations. The decode unit 140 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 140 is shown including packed data instruction set 145 for performing operations on packed data. In one embodiment, the packed data instruction set 145 includes the following instructions: a move instruction(s) 150, a shuffle instruction(s) 155, an add instruction(s) (such as ADDPS) 160, and a multiply instruction(s) 165. The MOVAPS, SHUFPS and ADDPS instructions are applicable to packed floating point data, in which the results of an operation between two sets of numbers having a predetermined number of bits, are stored in a register having the same predetermined number of bits, i.e., the size or configuration of the operand is the same as that of the result register. The operation of each of these instructions is further described herein. While one embodiment is described in which the packed data instructions operate on floating point data, alternative embodiments could alternatively or additionally have similar instructions that operate on integer data.

In addition to the packed data instructions, processor 105 can include new instructions and/or instructions similar to or the same as those found in existing general purpose processors. For example, in one embodiment the processor 105 supports an instruction set which is compatible with the Intel® Architecture instruction set used by existing processors, such as the Pentium® II processor. Alternative embodiments of the invention may contain more or less, as well as different, packed data instructions and still utilize the teachings of the invention.

The registers 141 represent a storage area on processor 105 for storing information, including control/status information, integer data, floating point data, and packed data. It will be understood by one of ordinary skill in the art that one aspect of the invention is the described instruction set for operating on packed data. According to this aspect of the invention, the storage area used for storing the packed data is not critical. The term data processing system is used herein to refer to any machine for processing data, including the computer systems (s) described with reference to FIG. 1.

While one embodiment of the invention is described in which the processor 105, executing the packed data instructions operates on 128-bit packed data operands containing four 32-bit single precision floating point values, the processor 105 can operate on packed data in several different packed data formats. For example, in one embodiment, packed data can be operated on in one of three formats: a "packed byte" format (e.g., PADDb), a "packed word" format (e.g., PADDw), or a "packed double word" (dword) format (e.g., PADDd). The packed byte format includes eight separate 8-bit data elements the packed word format includes four separate 16-bit data elements; the packed dword format includes two separate 32-bit data elements. While certain instructions are discussed below with reference to one or two packed data formats, the instructions may be similarly applied the other packed data formats of the invention.

Figure 2:
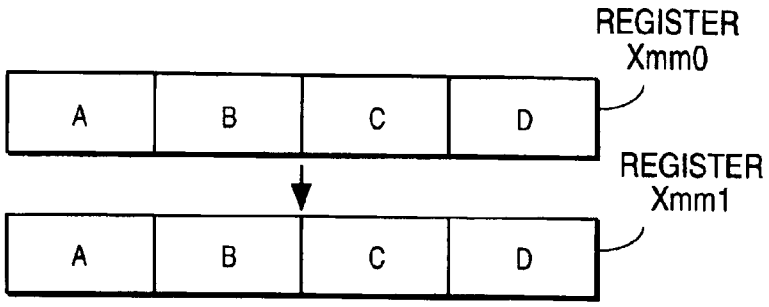
FIG. 2 illustrates the operation of the move instruction in accordance with one embodiment of the invention.

The shuffle instruction of the present invention is part of a family of many different instructions which operate with SIMD architecture. For example, FIG. 2 illustrates the operation of the move instruction 150 according to one embodiment of the invention. In this example, the move instruction 150 (MOVAPS) moves bits of data from one register to another register or from one memory location to another. In one embodiment, 64-bits representing four packed words are moved from one memory location to another or from one register to another.

Figure 3:
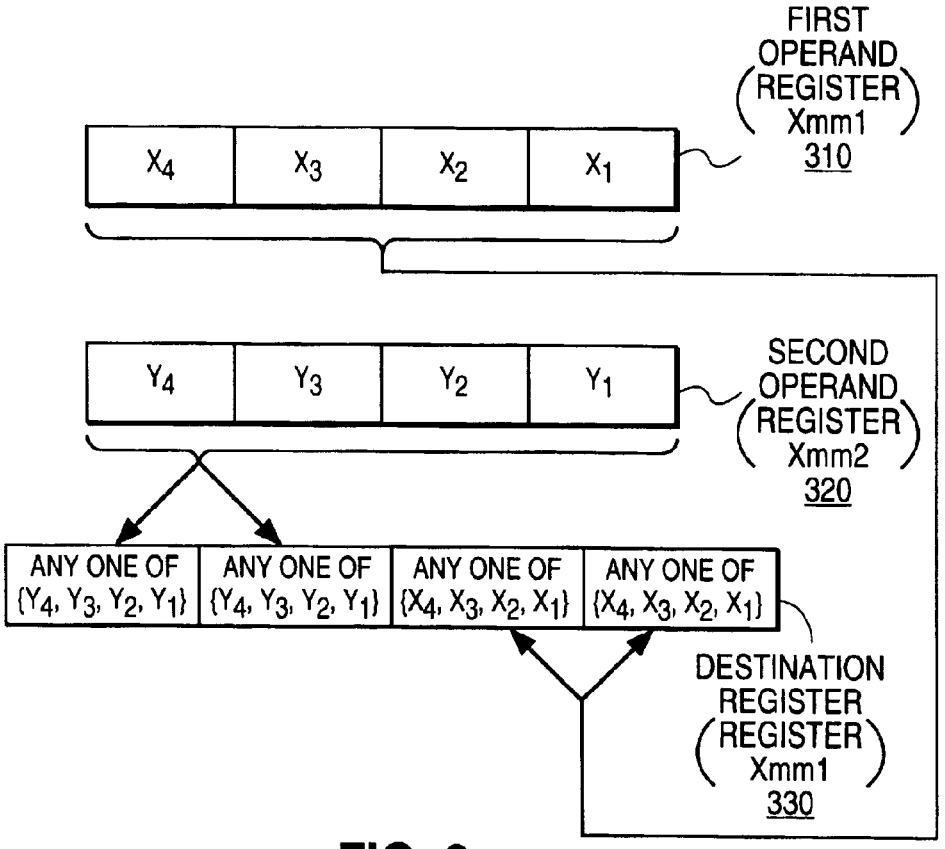
FIG. 3 illustrates the operation of the shuffle instruction in accordance with one embodiment of the invention.

FIG. 3 illustrates the operation of the shuffle instruction 155 according to one embodiment of the invention. In one embodiment, the shuffle instruction 155 (SHUFPS) is able to shuffle any one of a plurality (e.g., four) single floating point (FP) numbers from a first operand 310 to the lower two destination fields of a destination register 330; the upper two destination fields are generated from a shuffle of any one of a plurality (e.g., four) single FP numbers from a second operand 320.

Figure 4:
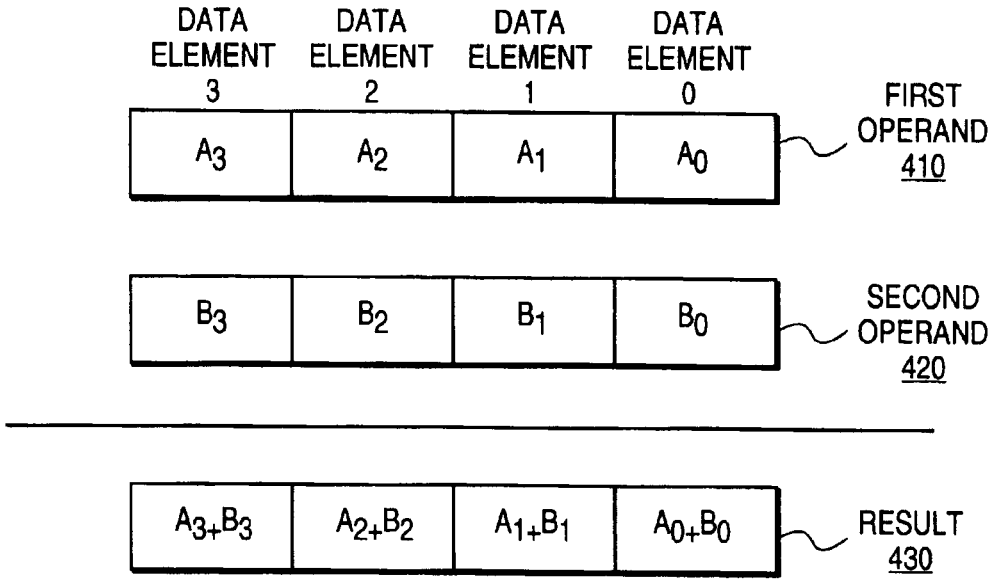
FIG. 4 illustrates the operation of the inter-add instruction in accordance with one embodiment of the invention.

FIG. 4 illustrates the operation of the packed vertical add instruction 160 according to one embodiment of the invention. In one embodiment, the packed vertical operation is the add instruction (ADDPS) 160, which operates on the data elements of a first to operand 410 and a second operand 420. In particular, the data elements of a first operand 410 are added to the respective packed data elements of a second operand 420, and are used to generate a result 430. For example, data element 0 of the first operand 410 is added to data element 0 of the second operand 420 and the result is stored as data element 0 of the result 430. The packed multiply instruction acts in a similar manner to the packed add instruction, except multiply operations are performed.

SHUFFLE OPERATION

Figure 5:
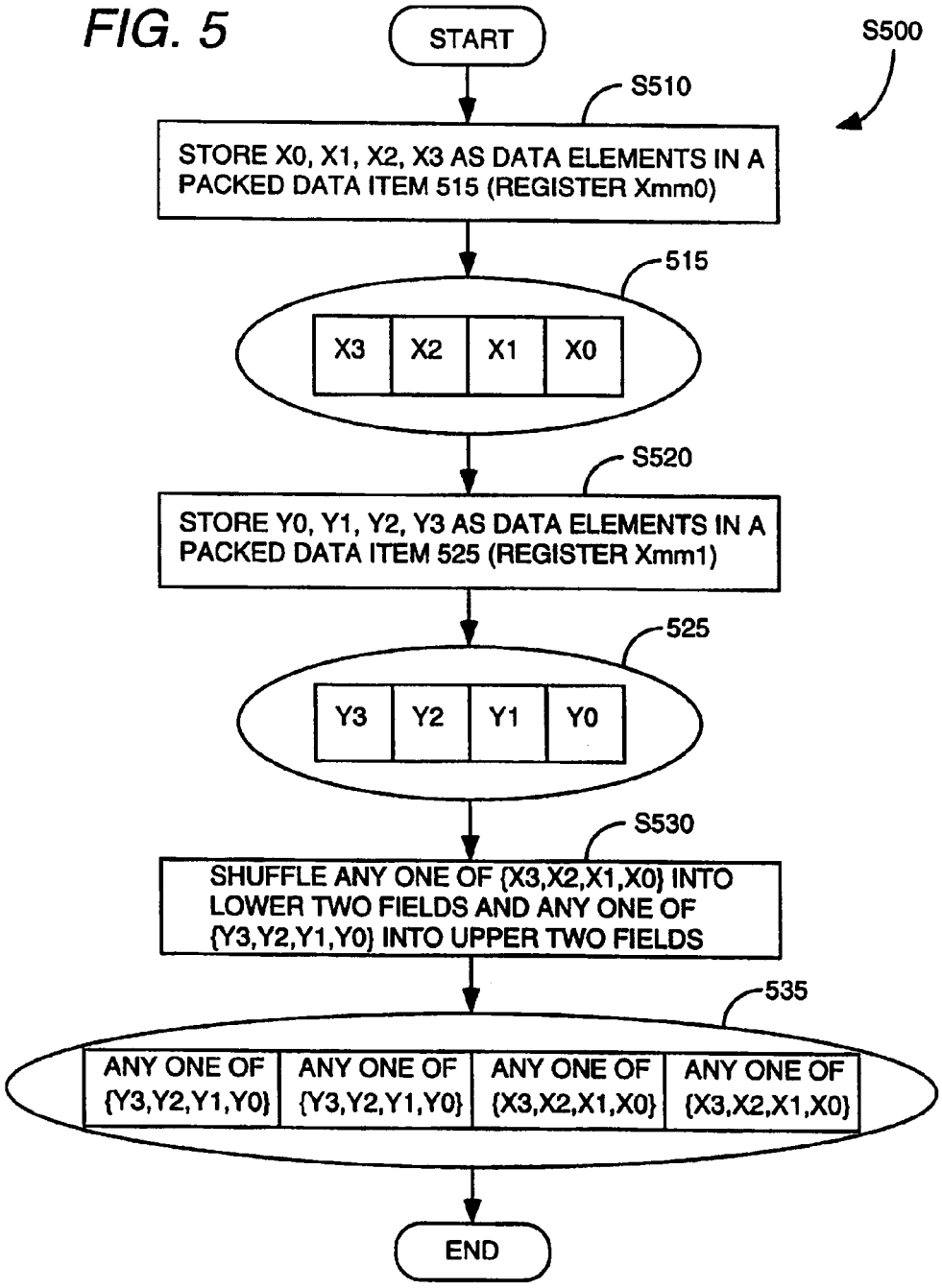
FIG. 5 illustrates the operation of the shuffle instruction in accordance with one embodiment of the invention.

FIG. 5 illustrates a technique for performing a shuffle operation on two numbers according to one embodiment of the invention. In this application, data is represented by ovals, while instructions are represented by rectangles. Beginning from a start state, the process S500 proceeds to process step S510, where numbers X0, X1, X2 and X3 are stored as data elements in a packed data item 515. For present discussion purposes, each data element is 16-bits wide and is contained in register X0, in the following order:

[|X3|X2|X1X|X0|]

|*X3*|*X2*|*X1*|*X0*|

The process S500 then proceeds to process step S520, where numbers Y0, Y1, Y2 and Y3 are stored as data elements in a packed data item 525. For present discussion purposes, each data element is 16-bits wide and is contained in register X1, in the following order:

|Y3|Y2|Y1|Y0|

The process S500 then advances to process step S530, where a shuffle instruction is performed on the contents of register X0 (data item 515) and register X1 (data item 525) to shuffle any one of the four data elements from the first data item 515 to the lower two fields of a destination register 535, and to shuffle any one of the four data elements from the second data item 525 to the upper two fields of the destination register 535. The resulting data item 535 is as follows:

|{Y3, Y2, Y1, Y0}|{Y3, Y2, Y1, Y0}|{X3, X2, X1, X0}|{X3, X2, X1, X0}|

Accordingly, a shuffle operation is performed. Although FIG. 5 illustrates an example of the shuffle operation with data operands having four data elements, the principles of the invention may also be implemented in data operands having at least two elements.

An 8-bit immediate value is used as a control word to indicate how data elements should be shuffled. Bits 0,1 of the control word indicate which of the four data elements in the first operand are shuffled into the first or lowest data element of the destination register. Bits 2,3 of the control word indicate which of the four data elements in the first operand are shuffled into the second data element of the destination register. Bits 4,5 of the control word indicate which of the four data elements in the second operand are shuffled into the third data element of the destination register. Bits 6,7 of the control word indicate which of the four data elements in the second operand are shuffled into the fourth data element of the destination register. For example, given a first data operand with four data elements contained in the following order:

|D|C|B|A| and also given a second data operand with four data elements contained in the following order:

|H|G|F|E| and also given a shuffle control word of 10001111, the result of the shuffle is as follows:

|G|E|D|D|

It will be recognized by one of ordinary skill in the art that the size of the shuffle control word may vary depending without loss of compatibility with the present invention, depending on the number of data elements in the source data operand and the number of fields in the destination register.

Figure 6A:
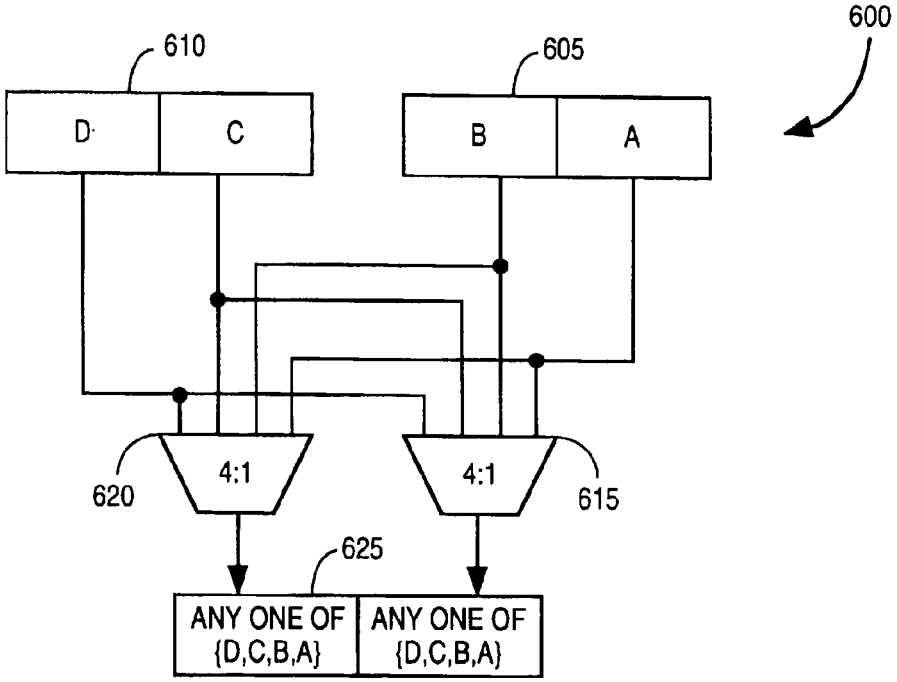
FIGS. 6a and 6b illustrate the operation of the shuffle instruction in accordance with one embodiment of the invention.

FIG. 6a illustrates a schematic for performing a shuffle operation on two numbers according to one embodiment of the invention. The device 600 reads the contents of a first source packed data operand 605 and a second source packed data operand 610. A four to one data multiplexer 615 shuffles any one of data elements {D,C,B,A} from either data operands 605, 610 into the lower field of destination data item 625. A four to one data multiplexer 620 shuffles any one of data elements {D,C,B,A} from either data operands 605, 610 into the upper field of destination data item 625.

Figure 6B:
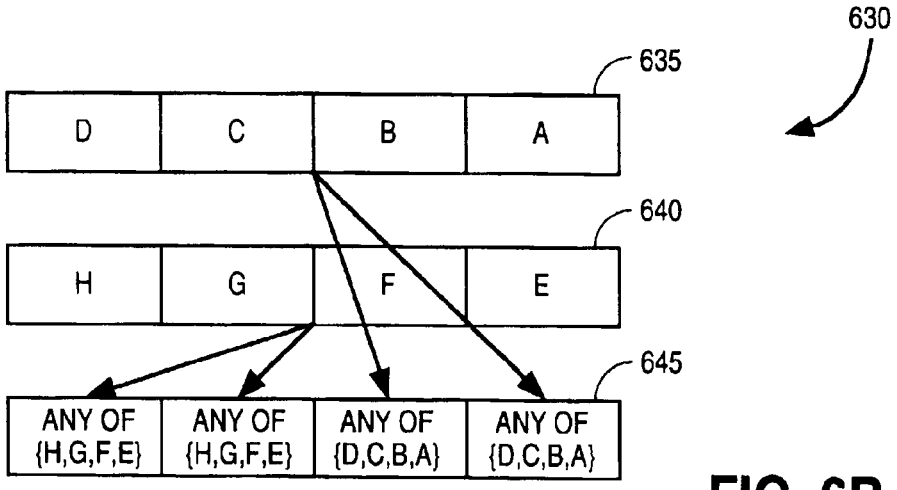

FIG. 6b illustrates a diagram for performing a shuffle operation on two numbers according to one embodiment of the invention. The device 630 reads the contents of a first source packed data operand 635. Any one of data elements {D,C,B,A} from the data operand 635 are shuffled into the lower two fields of destination data item 645. The device 630 then reads the contents of a second source packed data operand 640. Any one of data elements {H,G,F,E} from the data operand 640 are shuffled into the upper two fields of destination data item 645. The first source data operand 635 may be the same as the second source data operand 640. This method of shuffling may be performed with only an 8-bit control word.

Accordingly, a shuffle operation is performed. Although FIGS. 6a and 6b illustrate an example of the shuffle operation with data operands having two data elements, the principles of the invention may also be implemented in data operands having more than two elements.

Figure 7:
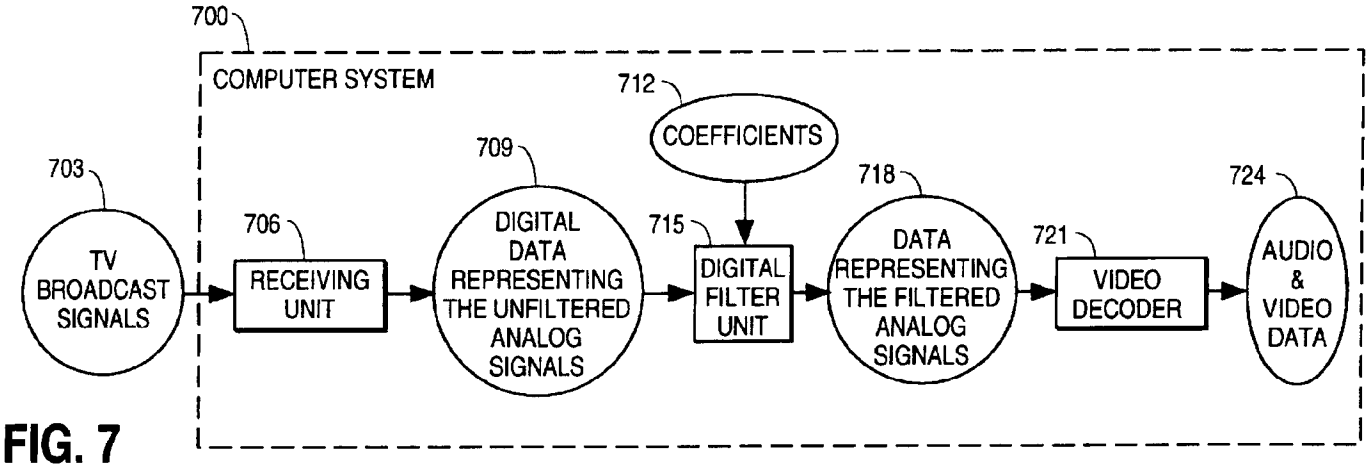
FIG. 7 is a general block diagram illustrating the usage of a digital filter which utilizes shuffle operations, for filtering a TV broadcast signal in accordance with one embodiment of the invention.

The shuffle instruction of the present invention may be used as part of many different applications. For example, FIG. 7 is a general block diagram illustrating the use of a digital filter which utilizes a shuffle operation for filtering a TV broadcast signal according to one embodiment of the invention. FIG. 7 shows TV broadcast signals 703 representing a television broadcast being received by a receiving unit 706 of a computer system 700. The receiving unit 706 receives the TV broadcast signals 703 and transforms them into digital data 709. A digital filter unit 715 performs a digital filter (e.g., FIR, IIR, etc.) on the digital data 709 using a set of coefficients 712. As a result, the digital filter unit 715 generates filtered data 718 (also termed as "filtered data items") representing the filtered analog TV broadcast signals. In performing the filtering operation, shuffle operations are implemented. The filtered data 718 are received by a video decoder 721 for conversion into and audio & video data 724. The techniques performed by video decoder 721 are well known (see Jack, Smith, Keith, "NTSC/PAL Digital Decoder", Video Demystified, High Text Publications, Inc., 1993) The audio and video data can be used for any purpose (e.g., display on a screen).

In one embodiment, the computer system 100 shown in FIG. 1 is used to implement the computer system 700 in FIG. 7. In this embodiment, the TV broadcast signal receiver 131 acts as the receiving unit 706 and may include a TV tuner, an analog to digital converter, and a DMA channel. The TV broadcast signals 703 are received by the TV tuner, converted into digital data by the analog to digital converter, and then sorted in the storage device 110 by the DMA channel. It will be recognized by one of ordinary skill in the art that the digital data sorted by the TV broadcast signal receiver 131 may be stored in any number of formats. For example, the TV broadcast signal receiver 131 may store the data in the main memory in one or more of the formats described herein—storing two representations of each of the components of the data such that it may be read in as packed data item in the described formats. This data may then be accessed as packed data and copied into registers on the processor 105. Since the data is stored in the disclosed formats, the processor 105 can easily and efficiently perform the shuffle operation as described with reference to FIG. 5 and FIG. 6. It will be recognized by one of ordinary skill in the art that the receiving unit 706 may encompass additional hardware, software, and/or firmware in the TV broadcast signal receiver 131 or software executing on the processor 105. For example, additional software may be sorted in the storage device 110 for further processing the data prior to the digital filter being performed.

In this embodiment, the digital filter unit 718 is implemented using the processor 105 and the software 136 to perform the a digital filter. In this embodiment, the processor 105, executing the software 136, performs the digital filter using shuffle operations, and stores the filtered data 718 in storage device 110. In this manner, the digital filter is performed by the host processor of the computer system, rather than the TV broadcast signal receiver 131. As a result, the complexity of the TV broadcast signal receiver 131 is reduced. In this embodiment, the video decoder 721 may be implemented in any number of different combinations of hardware, software, and/or firmware. The audio and video data 724 can then be sorted, and/or displayed on the display 125 and the sound unit 134, respectively.

Figure 8:
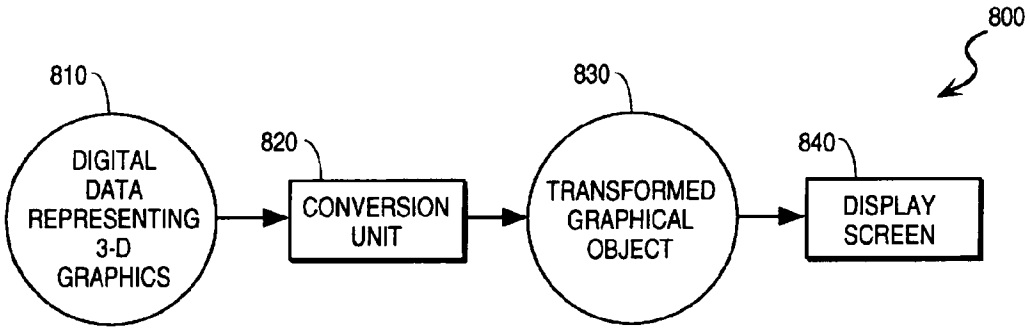
FIG. 8 is a general block diagram illustrating the use of shuffle operations, in rendering graphical objects in animation.

FIG. 8 is a general block diagram illustrating the use of a shuffle operation for rendering graphical objects in animation according to one embodiment of the invention. FIG. 8 shows a computer system 800 containing digital data 810 representing 3-dimensional (3D) graphics. The digital data 810 may be stored on a CD ROM or other type of storage device for later use. At sometime, the conversion unit 820 performs alteration of data using 3D geometry which includes the use of a shuffle operation to manipulate (e.g., scale, rotate, etc.) a 3D object in providing animation. The resulting graphical object 830 is then displayed on a screen display 840. The resulting graphical object may also be transmitted to a recording device (e.g., magnetic storage, such as tape).

In one embodiment, the computer system 100 shown in FIG. 1 is used to perform the graphics operation 800 from FIG. 8. In this embodiment, the digital data 810 from FIG. 8 is any data stored in the storage device 110 representing 3D graphics. In one embodiment, the conversion unit 820 from FIG. 8 is implemented using the processor 105 and the software 136 to alter data using 3D geometry. An example of such alteration of data includes the performance of a 3D transformation. In this embodiment, the processor 105, executing the software 136, performs the transformation and stores the transformed data 830 in the storage device 110 and/or provide, the transformed data to the graphics unit 135. In this manner, the 3D manipulation performed by the host processor of the computer system is provided at an increased speed. The present invention thus facilitates the performance of a shuffle operation through the use of available instruction sequences.

While several examples uses of shuffle operations have been described, it will be understood by one of ordinary skill in the art that the invention is not limited to these uses. In addition, while the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

[1. A computer system comprising:

a hardware unit to transmit data representing graphics to another computer or a display;

a processor coupled to the hardware unit; and a storage device coupled to the processor and having stored therein an instruction, which when executed by the processor, causes the processor to at least, access a first packed data operand having at least two data elements;

access a second packed data operand having at least two data elements;

select a first set of data elements from the first packed data operand;

copy each of the data elements in the first set to specified data fields located in the tower half of a destination operand;

select a second set of data elements from the second packed data operand; and copy each of the data elements in the second set to specified data fields located in the upper half of the destination operand.]

[2. The computer system of claim 1 wherein the storage device further comprises a packing device for packing floating point data into the data elements.]

[3. The computer system of claim 1 wherein the storage device further comprises a packing device for packing integer data into the data elements.]

[4. A system as claimed in claim 1 wherein the first and second packed data operands are the same operand.]

[5. A method comprising the computer-implemented steps of:

decoding a single instruction;

in response to the step of decoding the single instruction, accessing a first packed data operand having at least two data elements;

accessing a second packed data operand having at least two data elements;

selecting a first set of data elements from the first packed data operand;

copying each of the data elements in the first set to specified data fields located in the lower half of a destination operand;

selecting a second set of data elements from the second packed data operand; and copying each of the data elements in the second set to specified data fields located in the upper half of the destination operand.]

[6. The method of claim 5 further comprising the step of packing floating point data into the data elements.]

[7. The method of claim 5 further comprising the step of packing integer data into the data elements.]

[8. A method as claimed in claim 5 wherein the first and second packed data operands are the same operand.]

[9. A method comprising the computer implemented steps of:

accessing data representative of a first three-dimensional image;

altering the data using three-dimensional geometry to generate a second three-dimensional image, the step of altering at least including, accessing a first packed data operand having at least two data elements;

accessing a second packed data operand having at least two data elements;

selecting a first set of data elements from the first packed data operand;

copying each of the data elements in the first set to specified data fields located in the lower half of a destination operand;

selecting a second set of data elements from the second packed data operand;

copying each of the data elements in the second set to specified data fields located in the upper half of the destination operand; and displaying the second three-dimensional image.]

[10. The method of claim 9 wherein the step of altering includes the performance of a three-dimensional transformation.]

[11. The method of claim 9 wherein the step of altering includes the step of packing floating point data into the data elements.]

[12. The method of claim 9 wherein the step of altering includes the step of packing integer data into the data elements.]

[13. A method as claimed in claim 9 wherein the first and second packed data operands are the same operand.]

[14. A method comprising the computer implemented steps of:

accessing data representative of a first three-dimensional image;

altering the data using three-dimensional geometry to generate a second three-dimensional image, the step of altering at least including, accessing a first packed data operand having at least two data elements;

accessing a second packed data operand having at least two data elements;

selecting a first set of data elements from the first packed data operand;

copying each of the data elements in the first set to specified data fields located in the lower half of a destination operand;

selecting a second set of data elements from the second packed data operand;

copying each of the data elements in the second set to specified data fields located in the upper half of the destination operand; and displaying the second three-dimensional image.]

[15. The method of claim 14 wherein the step of altering includes the performance of a three-dimensional transformation.]

[16. The method of claim 14 wherein the step of altering includes the step of packing floating point data into the data elements.]

[17. The method of claim 14 wherein the step of altering includes the step of packing integer data into the data elements.]

[18. A method as claimed in claim 14 wherein the first and second packed data operands are the same operand.]

19. A processor-implemented method for reducing the number of control hits required to shuffle packed data elements from first and second source operands, comprising the steps of:

decoding a single instruction specifying first and second source operands and a field of control bits; and responsive to the field of control bits, generating a resultant packed data operand comprised of packed data elements from the first and second source operands, wherein the control bits are limited to specifying for the upper and lower halves of the resultant packed data operand, data elements from the first and second source operands, respectively.

20. The method as claimed in claim 19 wherein the first and second packed data source operands and the resultant packed data operand are comprised of four packed data elements, and the field of control bits is an 8-bit field.

21. The method as claimed in claim 19 wherein the first and second packed data source operands are the same operand.

22. The method as claimed in claim 19 wherein the first and second packed data source operands are packed with floating point data.

23. A processor for performing a shuffle operation in response to a shuffle instruction comprising:

a decoder which decodes a single instruction specifying first and second source operands and a field of control bits; and an execution unit which, responsive to the field of control bits, generates a resultant packed data operand comprised of packed data elements from the first and second source operands, wherein the control bits are limited to specifying for the upper and lower halves of the resultant packed data operand, data elements from the first and second source operands, respectively.

24. The processor as claimed in claim 23 wherein the first and second source operands are the same operand.

*25. The method as claimed in claim 19 wherein the first and second packed data source operands and the resultant packed data operand are each comprised of at least two packed data elements.*

*26. The method as claimed in claim 19 wherein the field of control bits is an 8-bit field.*

*27. The method as claimed in claim 26 wherein an 8-bit immediate to fill the field of control bits is decoded with the single instruction.*

*28. The processor of claim 23 wherein said field of control bits comprises of an 8-bit immediate value.*

*29. The processor of claim 23 wherein said field of control bits comprises of an 8-bits.*

*30. The processor of claim 29 wherein said first and second source operands comprise of double-precision floating-point values.*

*31. The processor of claim 29 wherein said first and second source operands comprise single-precision floating-point values.*

*32. The processor of claim 29 wherein said packed data elements comprise of packed double words.*

*33. The processor of claim 29 wherein said packed data elements comprise of packed words.*

*34. The processor of claim 29 wherein said packed data elements comprise of packed bytes.*

*35. The processor of claim 29 wherein said first and said second operands comprise of 128-bits of packed data.*

*36. An apparatus comprising:*

*a decode unit to decode a shuffle instruction into control signals, said shuffle instruction to include a first operand, a second operand, and a third operand wherein said third operand comprises of an 8-bit immediate value;*

*said first operand to identify a first register to hold at least two packed data elements;*

*said second operand to identify a memory location to hold at least two packed data elements;*

*said third operand is to provide selection bits to indicate which of said packed data elements in said first operand and said second operand to select and copy to a resultant register; and*

*an execution unit coupled to said decode unit, said execution unit responsive to said control signals and said selection bits to select a first set of data elements from said first register and to copy said first set of data elements to one or more lower destination fields of said resultant register, said execution unit further responsive to said control signals and said selection bits to select a second set of data elements from said memory location and to copy said second set of data elements to one or more upper destination fields of said resultant register.*

*37. The apparatus of claim 36 wherein said data elements of said first register and said second register comprise double-precision floating-point values.*

*38. The apparatus of claim 36 wherein said data elements of said first register and said second register comprise of single-precision floating-point values.*

*39. The apparatus of claim 36 wherein said packed data elements comprise of packed double words.*

*40. The apparatus of claim 36 wherein said packed data elements comprise of packed words.*

*41. The apparatus of claim 36 wherein said packed data elements comprise of packed bytes.*

*42. The apparatus of claim 36 wherein said first register is also said resultant register.*

*43. An apparatus comprising:*

*an instruction decoder to receive and decode a shuffle instruction, said shuffle instruction to include an immediate operand comprising two or more sets of control bits;*

*a first source register to hold a first packed data, said first packed data comprising of a first data element and a second data element;*

*a second source register to hold a second packed data, said second packed data comprising of a third data element and a fourth data element;*

*a destination register to hold a third packed data;*

*an execution unit coupled to said first source resister to receive said first packed data, and to said second source register to receive said second packed data; and*

*wherein said execution unit is further coupled to said instruction decoder to receive said two or more sets of control bits, said execution unit to select from said first source register at least one of said first and second data elements in response to a first one of said two or more sets of control bits and to copy said selected data element from said first source register to a first data field in a lower half of said destination register, and said execution unit to select from said second source register at least one of said third and fourth data elements in response to a second one of said two or more sets of control bits and to copy said selected data element from said second source register to a second data field in an upper half of said destination register.*

*44. The apparatus of claim 43 wherein said immediate operand is an 8-bit immediate operand.*

*45. The apparatus of claim 43 wherein said data elements of said first source register and said second source register comprise of double-precision floating-point values.*

*46. The apparatus of claim 43 wherein said data elements of said first source register and said second source register comprise of single-precision floating-point values.*

*47. The apparatus of claim 43 wherein said packed data comprise of packed double words.*

*48. The apparatus of claim 43 wherein said packed data comprise of packed words.*

*49. The apparatus of claim 43 wherein said packed data comprise of packed bytes.*

*50. The apparatus of claim 43 wherein said apparatus is defined by machine readable data on a machine readable medium.*

*51. The apparatus of claim 43 wherein said first source register is also said destination register.*

*52. The apparatus of claim 43 wherein said first source register is the same as said second source register.*

*53. The apparatus of claim 43 wherein said two or more sets of control bits comprise bits 0 and 1 of the immediate operand.*

*54. The apparatus of claim 44 wherein said 8-bit immediate operand comprises bits 0 and 1 to select from said first source register which data element is copied into the lowest data field in the lower half of the destination register, and bits 4 and 5 to select from said second source register which data element is copied into the lowest data field in the upper half of the destination register.*

*55. The apparatus of claim 44 wherein said 8-bit immediate operand comprises bits 0 through 3 to select from said first source register which data elements are copied into the lower half of the destination register, and bits 4 through 7 to select from said second source register which data elements are copied into the upper half of the destination register.*

*56. The apparatus of claim 55 wherein said 8-bit immediate operand comprises bits 2 and 3 to select from said first source register which data element is copied into the highest data field in the lower half of the destination register, and bits 6 and 7 to select from said second source register which data element is copied into the highest data field in the upper half of the destination register.*

* * * * *